Figure 1:
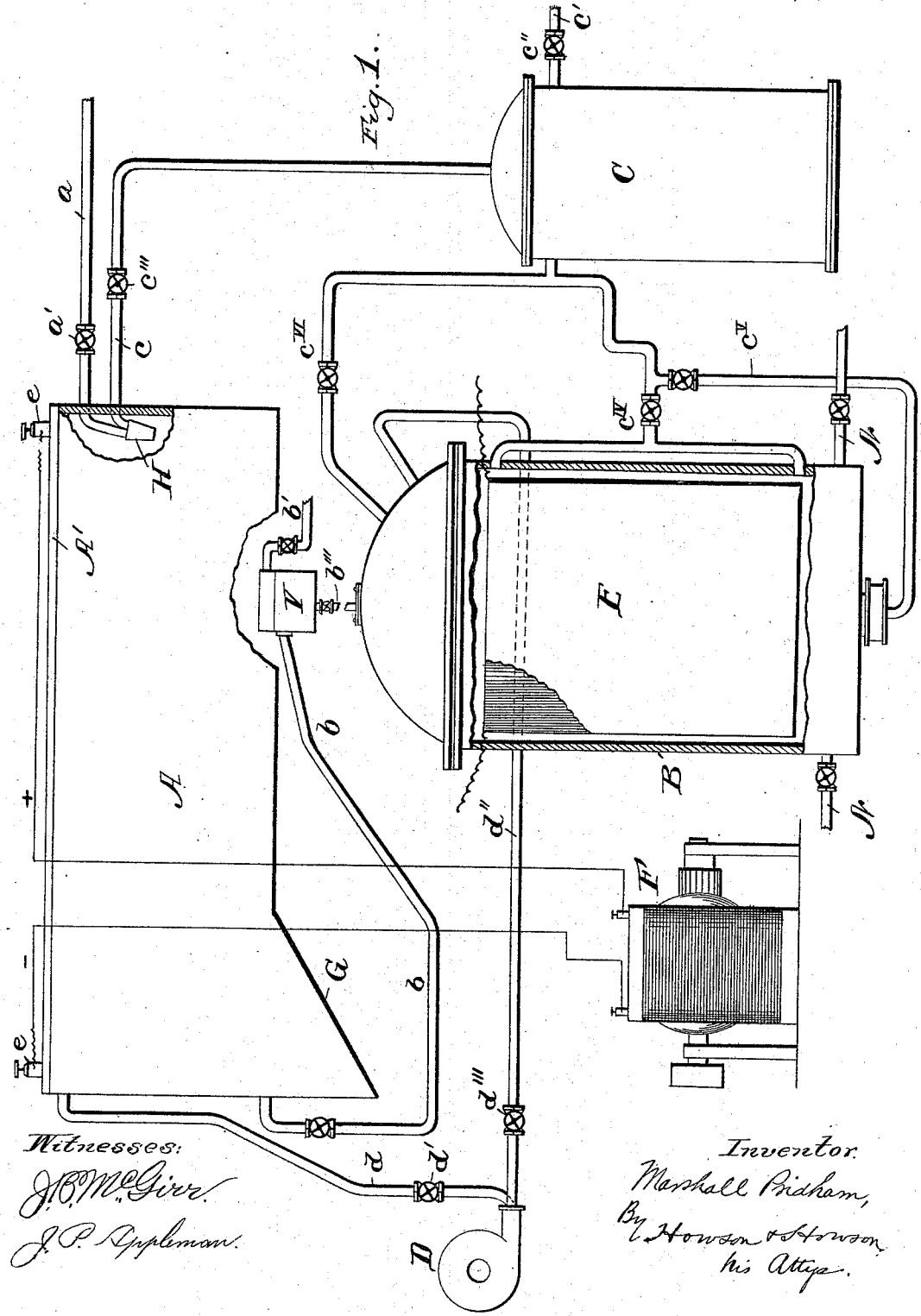

(No Model.) 3 Sheets—Sheet 1.

M. PRIDHAM.
APPARATUS FOR PURIFYING AND DECOLORIZING SACCHARINE OR OTHER LIQUIDS.

No. 573,355. Patented Dec. 15, 1896.

Witnesses:
J. B. McGirr.
J. P. Appleman.

Inventor.
Marshall Pridham,
By Howson & Howson
his Attys.

(No Model.) 3 Sheets—Sheet 2.
M. PRIDHAM.
APPARATUS FOR PURIFYING AND DECOLORIZING SACCHARINE OR OTHER LIQUIDS.
No. 573,355. Patented Dec. 15, 1896.
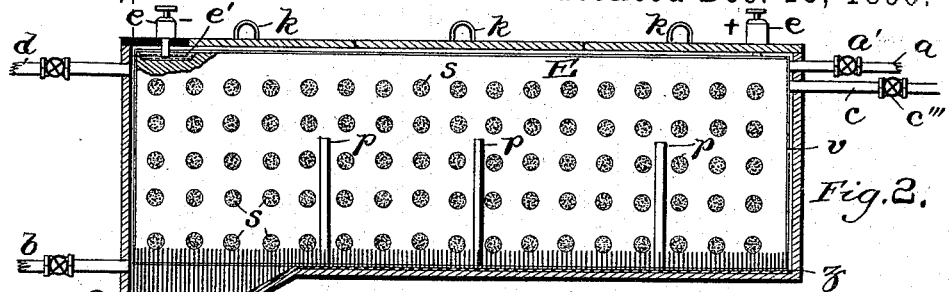
Fig. 2.
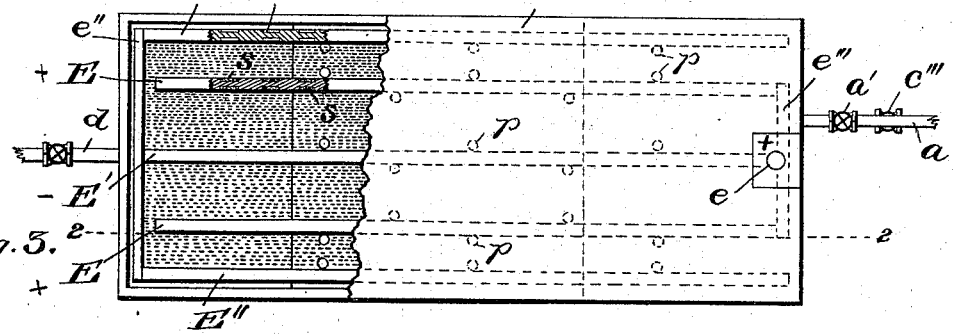
Fig. 3.
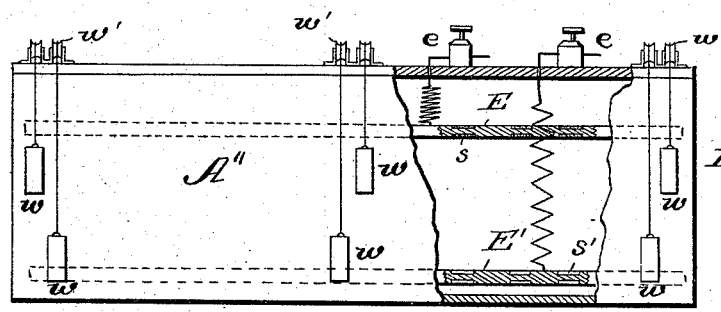
Fig. 5.
Fig. 4
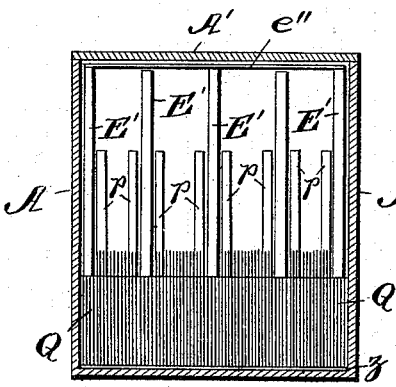
Witnesses:
J. B. McGirr.
J. P. Appleman.
Inventor.
Marshall Pridham,
By Henson & Henson,
his Attys
THE NORRIS PETERS CO., PHOTO-LITHO., WASHINGTON, D. C.

(No Model.) 3 Sheets—Sheet 3.
M. PRIDHAM.
APPARATUS FOR PURIFYING AND DECOLORIZING SACCHARINE OR OTHER LIQUIDS.
No. 573,355. Patented Dec. 15, 1896.
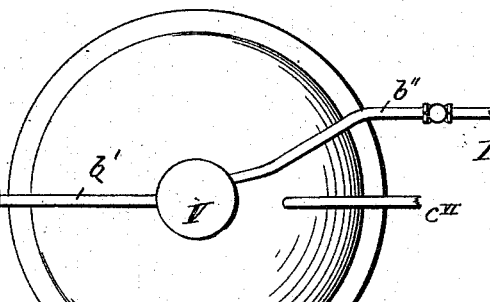
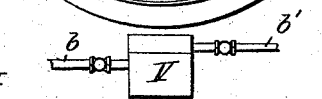
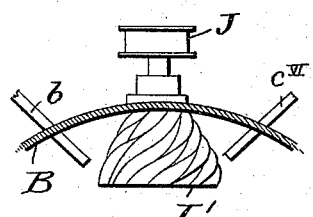
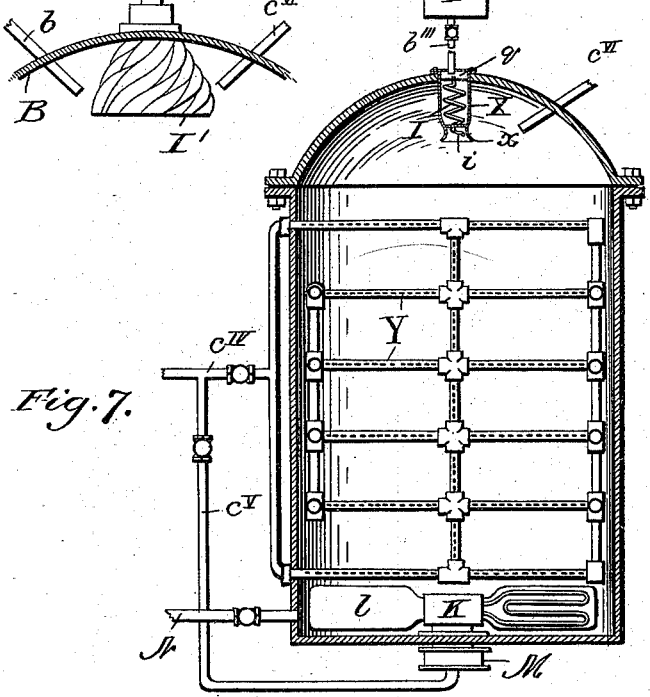
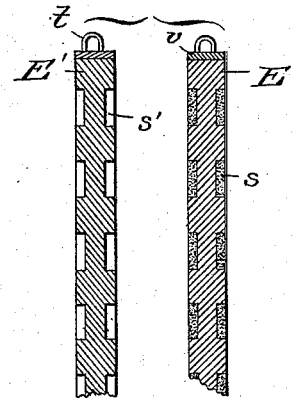
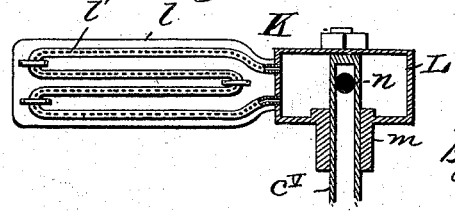
Witnesses:
J. B. McGirr.
J. P. Appleman.
Inventor:
Marshall Pridham,
By Howson & Howson,
his Attys.

UNITED STATES PATENT OFFICE.

MARSHALL PRIDHAM, OF PHILADELPHIA, PENNSYLVANIA, ASSIGNOR, BY DIRECT AND MESNE ASSIGNMENTS, TO THE ELECTRIC RECTIFYING AND REFINING COMPANY, OF CAMDEN, NEW JERSEY.

APPARATUS FOR PURIFYING AND DECOLORIZING SACCHARINE OR OTHER LIQUIDS.

SPECIFICATION forming part of Letters Patent No. 573,355, dated December 15, 1896.

Application filed September 12, 1896. Serial No. 605,631. (No model.)

*To all whom it may concern:*

Be it known that I, MARSHALL PRIDHAM, a citizen of the United States, and a resident of Philadelphia, county of Philadelphia, State of Pennsylvania, have invented certain new and useful Improvements in Apparatus for Purifying and Decolorizing Saccharine or other Liquids, of which the following is a specification.

My invention relates to apparatus for purifying and decolorizing saccharine and other liquids, such as saccharine liquids, water, &c., which contain organic, nitrogenous, or mechanical impurities, and more particularly to such apparatus in which the purification and decolorization are effected through the agencies of an electric current and ozone gas.

My objects are to provide an efficient and economically-constructed apparatus of the general character above defined in which the process of purification and decolorization may be conducted in the speediest, most economical, and most effective manner, and one which is peculiarly adapted for carrying out the process of purification of saccharine liquids by subjecting the liquids to the influence of an electric current and to the action of ozone gas *in vacuo*, such as that described and claimed in my application for Letters Patent, filed September 10, 1896, Serial No. 605,441.

With these objects in view my invention consists in the novel apparatus and details thereof, as hereinafter described, and more particularly pointed out in the claims, with reference to the accompanying drawings, in which—

Figure 1 is a side elevation of a plant embodying my invention, the parts being shown in exaggerated position and proportions for clear illustration. Fig. 2 is a longitudinal sectional view of the main tank, taken on the line 2 2, Fig. 3. Fig. 3 is a top plan view of the same, partly sectional. Fig. 4 is a transverse vertical sectional view of the same on the line 4 4, Fig. 2. Fig. 5 is a side view of a modification thereof, partly in section. Fig. 6 is a top plan view of the secondary tank. Fig. 7 is a central vertical sectional view of the same, partly in elevation. Fig. 8 is a detail of the positive and negative electrodes. Fig. 9 is a sectional detail of the agitator. Fig. 10 is a detail of a modified form of spraying device.

Referring now to the drawings, in which the same or similar reference-letters indicate the same or corresponding parts in all the views, the letter A designates a tank of suitable size and shape, preferably rectangular, provided with a cover A', which cover is preferably made in sections, to each of which sections are attached rings or eyebolts $k$, by means of which the said sections may be readily placed in proper position on the tank through the medium of suitable hoisting devices. A pipe $a$, provided with a suitable valve $a'$, is connected with the tank A, through which pipe the liquid to be treated is conveyed from a source of supply to the tank. The liquid may be supplied from an elevated reservoir by gravity or by centrifugal or other pump, such as in common use. The pipe $a$ preferably terminates in an ejector H, into which also leads a pipe $c$ from a reservoir or tank C, containing ozone gas derived from any suitable source, connected with said reservoir by a pipe $c'$, provided with a valve $c''$, the object of which construction is to cause the gas as it rushes into the tank to draw the liquid in with it and cause the two to mingle together as they enter the tank.

An air-exhauster or vacuum-pump D, of any desirable construction, is connected to the tank A by a pipe $d$, provided with a valve $d'$, so that a vacuum or partial vacuum may be established in said tank and the air withdrawn from the liquid contained therein.

Supported within the tank A, between suitable guide-rods $p$, are plates E E', forming electrodes, the former constituting the anodes and the latter the cathodes, there being shown, in the present instance, three such cathodes connected together by binding-plates $e''$ and two such anodes connected together by similar binding-plates $e'''$. Each of the electrodes is preferably surrounded by a metal band $v$, having hoisting bolts or rings $t$ thereon for the purpose of forming a connection for suitable hoisting apparatus for lowering the plates into position, or lifting them when it is desired to remove the said plates from the tank.

In order to facilitate the electrolytic action upon the liquid, I preferably employ a positive electrode of aluminium, or zinc, or other metal plate of a pitted, corrugated, or cellular structure, the pits $s$ of which, Fig. 8, are preferably filled with an active material composed of a metallic compound capable of decolorizing saccharine liquids, such as aluminium hydrate, zinc oxid, and the like. The negative plate is likewise of a pitted, cellular, or corrugated structure, so that the aluminium hydrate, oxid of zinc, or other metallic compound may be deposited in the pits or cells of said plate and recovered therefrom by washing with water, in which the material is insoluble.

Ordinarily it will not be necessary to remove the plates for permitting the tank or plates to be cleaned, as the said plates are located a sufficient distance apart to permit such cleaning to be accomplished without removal. For renewing the plates they may be quickly lifted out, as indicated, and new plates inserted.

Mounted in the cover A and suitably insulated therefrom are the binding-posts $e$, the downwardly-extending conductors of which dip into a groove or recess $e'$ in the upper edge of one of the electrodes of each series to make the electric contact. The electrodes are connected through the respective binding posts and wires to a suitable electric generator F, preferably a direct-current generator, the circuit of which is of course provided with the necessary accessories for regulating the intensity and quantity of current and for turning the same on and off, as desired, which parts are not illustrated, as they may be of any approved design and form no part of my invention.

The bottom of the tank is provided with sediment-collecting racks Q, consisting of a number of metal pins carried, preferably, by removable plates $z$, placed on the bottom below the electrodes. These pins are arranged to extend a short distance above the bottom, as shown, and serve to collect and retain the sediment and precipitated impurities set free from the liquid, and to further collect the sediment in the bottom of the tank I preferably depress a portion of the bottom, forming a well or pocket G at one end of the tank, from which the said sediment may be withdrawn through a suitable outlet $y$.

Generally a treatment in the tank thus described will be sufficient to purify the liquids and partly clarify and decolorize them, and the mode of operation may be briefly described as follows: A sufficient quantity of the liquid being introduced into the tank A all connections with said tank are closed and the air-exhauster is started, the valve $d'$ being then opened and the said exhauster operated until a sufficient vacuum is created in the tank and the air entrained in the liquid withdrawn therefrom. After the vacuum has been formed, or while it is being formed, the electric current is turned on, so that the liquid is subjected to the electrolytic action. Under the electrolytic action the current of electricity passes from the positive electrodes through the liquid to the negative electrodes and causes the evolution of the gases from the water contained in the liquid, which attack the organic and nitrogenous matter held therein and cause the same to be deposited upon the cathodes and partly precipitated. This electrolytic action is greatly facilitated by the use of aluminium or zinc anode and still further increased by the employment of aluminium hydrate, zinc oxid, or other equivalent decolorizing compound upon the anode, which material is deposited upon the cathodes and has a decolorizing effect upon the liquid under treatment, after which it is recovered by washings, collecting the washings in suitable receptacles, from which the foreign matter is removed, precipitating the material in water, whence it is recovered for further use. The aluminium hydrate is the strongest and most effective agent for this purpose, because of the high decolorizing property, but the zinc plate and oxid answer ordinary requirements, and on account of their cheaper cost may generally be used. When, however, a very high degree of clarification and decolorization are desired, it is preferable to use the aluminium plate and hydrate of aluminium. As soon as a sufficient vacuum is obtained ozone gas is admitted to the tank, preferably at the same time that the electric current is turned on, the result of which admission is intimate and thorough mixture of the said gas with the liquid, the gas permeating the whole mass almost instantly and occupying the space previously held by the air. The ozone gas acts upon the liquid by oxidation, thereby causing the ready deposition of the impurities both under the influence of the electric current and by the oxidizing action of the ozone as well, and at the same time the ozone partly decolorizes and clarifies the liquid, and after about ten minutes' treatment the liquid may be removed and a fresh supply introduced.

The impurities are by the foregoing described treatment caused to deposit upon the cathodes and are partly precipitated to the bottom of the tank, where they are collected upon the pin collecting-racks Q, while some of the sediment is carried into the pocket or well G, whence it can be readily removed, the racks being cleaned as often as found necessary, either by removing the same and washing or by washing them in the tank, thus carrying the deposited impurities to the well or pocket, from which they are readily removed.

In some instances it is advisable to reduce the specific gravity of the liquid previous to treatment in the tank A, as too great a specific gravity retards the work of removing the mechanical impurities, and hence the decolorizing action is retarded, and in order to effect the necessary reduction I preferably add a sufficient quantity of water to reduce the gravity to a point between, say, 30° to 40° Baumé whenever the liquid has a gravity exceeding 40° Baumé. This water may be subsequently removed by the addition of heat, preferably *in vacuo*, and in the treatment of sugar, molasses, and all liquids, except the juice expressed from cane, beets, or sorghum, I find it advisable to heat the liquids to from 70° to 90° centigrade, the object of which is to render the same readily oxidizable in order to assist the deposition of organic and nitrogenous matter, which preliminary treatment is particularly advantageous with liquids containing albuminous or waxy matters, as the said matters coagulate and carry with them some of the impurities. When a high degree of decolorization and clarification is desired, I find that it is best to subject the liquid to a treatment with ozone *in vacuo* in a secondary tank or tanks, and will now describe a simple and effective construction for accomplishing this purpose, after briefly referring to the modification, Fig. 5.

In Fig. 5 I have shown a modification in which the electrodes E E' are arranged horizontally instead of vertically within a tank A'', the positive electrode uppermost. The two electrodes are balanced each by a set of weights $w$, connected thereto by cords or chains passing over pulleys $w'$ on the tank, so that the two plates may always be sufficiently balanced by the weights to adjust themselves to their proper positions according to the liquid-level, the upper one remaining always immersed just below the liquid-level as the latter rises or falls and the lower one remaining a suitable distance below the upper one, such distance being regulated by the weight of the balance-weight with which it is connected. The object of this arrangement is to provide for a treatment of the liquid by electric current preliminary to the treatment in the first tank A whenever the liquid contains a usual amount of dirt, sand, &c., which is readily deposited in the tank A'' by the electrolytic action.

Referring now to Figs. 1 and 7 particularly, B indicates a secondary tank of suitable size and shape, cylindrical in the present instance, which tank is preferably located on a lower level than the tank A, so that the liquid may run by gravity from the latter to the said secondary tank, though it is manifest that all the tanks may be on the same level, if circumstances do not permit the preferred arrangement, with suitable pumps for supplying and carrying the liquid from one tank to the other, such as now are in common use in sugar-refineries. The tank B is connected by a pipe $d''$ to the air-exhauster D, a valve $d'''$ in said pipe controlling the suction of said exhauster, whereby a vacuum may be obtained in said tank. In the top of said tank is preferably mounted a spraying device X in line with the inlet for liquid into said tank and close to the inlet for ozone gas, which is introduced through the pipe $c^{vi}$, leading from the ozone-reservoir C, and the spraying device may be of any suitable form, two being shown in Figs. 7 and 10, that in Fig. 7 consisting of a casing X, secured in the top of the tank B and having an outwardly-flaring bottom $x$, extending into the space in the top of said tank. The top $q$ of said casing communicates by a pipe $b'''$ with a reservoir V, which is connected with the tank A by the pipe $b$, the said reservoir V being sufficiently elevated above the tank B to give a considerable head to the liquid before it enters the tank B, and in order to increase the pressure on the liquid I preferably connect the top of the reservoir with a source of air under pressure by means of a pipe $b'$, provided with a suitable valve, so that an air cushion or pressure may be established above the liquid, which may thus be forced with considerable pressure into the chamber of the sprayer, whence it passes down around a screw or worm I, rotatably mounted in thin webs, less in width than the width of the casing X, and passing around the horizontally-turned end $i$ of said worm it causes the worm to rotate and discharges in a jet against the side walls of the flared end, causing an even distribution of the finely-divided liquid as it falls into the tank, and at the same time the ozone gas enters the tank through the pipe $c^{vi}$ and intimately mixes with the sprayed liquid as it falls into the tank.

The modified form of sprayer, Fig. 7, consists of a cone I', rotatably mounted in the top of the tank and adapted to be rapidly rotated by a driven pulley J, operated from any suitable source of power, the discharge-pipe $b$ from the tank A entering the tank B in front of said sprayer and the ozone-gas pipe $c^{vi}$ on the opposite side, so that the liquid is discharged from the tank A directly into the tank B, against the sprayer-cone, and in a finely-divided state mixes with the ozone gas as it falls into the tank.

In order to fully insure the intimate mixture of the ozone gas with the liquid, two other valved branch pipes $c^{iv}$ $c^{v}$ conduct the gas from the reservoir into the tank at different points, the one entering at one or more points in the side of the tank and distributing the gas through a perforated pipe structure Y, vertically disposed within the tank and immersed in the liquid, while the other leads through the bottom of the tank. To further insure the intimate mixture of the gas from the bottom, I preferably mount above the bottom of the tank an agitator K, consisting of a chambered hub L, provided with a number of horizontally-extending vanes or blades $l$, preferably four in number, each of which vanes carries perforated pipes $l'$, connected with the chamber L of the hub. The hub is preferably mounted to rotate upon the upwardly-projecting end of the pipe $c^v$, closed at its top and having lateral openings $n$, discharging the gas into the chamber L, whence it passes out through the perforated pipes $l'$. The agitator is rotated in any suitable manner, as by means of a pulley M, mounted upon a downwardly-extending collar or hub $m$, secured to or forming part of the hub L.

When it is desired to subject the liquid to a secondary treatment in the tank B, the air is exhausted therefrom by the exhauster D or other suitable air-ejector until a vacuum or sufficient partial vacuum is obtained, the liquid then allowed to flow into the tank, the ozone gas admitted through the various connections, and the agitator set in motion and the spraying device rapidly rotated at the same time. The result of this operation is to cause a thorough and intimate mixture of the ozone and the liquid, whereby a high degree of decolorization and clarification is effected in the shortest possible time. The tank is then cut off and the decolorized and clarified liquid drawn off through the discharge-pipe N and the operation repeated.

While I have thus far described the electrodes only in the tank A, if found desirable they may also be placed in the secondary tank, as shown in Fig. 1, and the electrolytic treatment continued therein, but generally the first electrolytic treatment will be found sufficient.

My apparatus may be used either upon the plantation where the cane-juice is expressed or at the sugar-refineries or other suitable places, and in the former case I find that by the electrolytic treatment I am able to cause the removal of albumen and waxy matters, which have a tendency to cause fermentation, thus preventing the serious objection now prevalent in the use of apparatus at present employed. I also find that I can prevent the tendency to inversion by such treatment, so that the liquid may be transported for further treatment in the subsequent crystallizing steps for producing solid sugars. In this connection I may state that I have found that the inversion that cane-sugar undergoes in the presence of water is not due entirely to the influence of mold or fungi, but is largely due to the fact that water acts as an acid, hydrates the sugar in the presence of air, and hence by the use of my apparatus in the manner described I entirely destroy this objectionable tendency.

It will of course be understood that any of the well-known means for agitating the liquid may be used in any or all of the tanks, such means being now commonly employed in the refining of syrups, &c. It will also be understood that in the treatment of syrups if a tendency to granulation is noticed the usual expedient of adding a sufficient quantity of glucose to correct this tendency may be employed.

In addition to the marked advantages above noted by the use of my apparatus, as described, I am enabled to dispense entirely with two costly and cumbersome steps now necessary in the art, in that I entirely obviate the necessity of the bag and char filters, both of which are the cause of great annoyance and trouble, as is well understood by those skilled in the art, and in so doing I secure the same or better results in less time and at less cost, my whole treatment requiring minutes where hours are needed in prior apparatus for the same purpose.

While I have shown what is at present deemed a preferable form of apparatus, various changes may be made in the details thereof without departing from the spirit of my invention, which is not limited to the specific details shown, for the reason that I believe that I am the first to devise an apparatus for carrying out the electrolytic and ozone treatment of saccharine liquids, as defined hereinbefore.

I claim as my invention—

1. In an apparatus for purifying saccharine or other liquids, the combination of a tank for holding the liquid to be treated, plates forming positive and negative electrodes placed within the tank and connected to a suitable source of electricity, and collecting-racks in the bottom of the tank for collecting the impurities precipitated from the liquid, substantially as described.

2. In an apparatus for purifying saccharine or other liquids, the combination with the tank containing the liquids to be treated, of plates carrying a metallic decolorizing compound, forming positive electrodes and pitted or cellular plates forming negative electrodes, placed within the liquid in the tank, and electrical connections between said electrodes and a suitable source of electricity, substantially as described.

3. In an apparatus for purifying saccharine or other liquids, the combination with the tank containing the liquid to be treated, of plates carrying a metallic decolorizing compound forming positive electrodes, plates having openings, pits or cells, adapted to receive the electrolytically-deposited metallic compound after it has passed from the positive electrodes through the liquid, and collecting devices in the bottom of the tank for collecting the precipitated impurities, substantially as described.

4. In an apparatus for purifying saccharine or other liquids, the combination with a tank for containing the liquid to be treated, of an ozone-reservoir connected to said tank, and an air-exhauster connected with said tank, electrodes within the tank connected to a suitable source of electricity, whereby the liquid may be subjected to the action of an electric current *in vacuo*, and a secondary tank having connections with the ozone-reservoir and air-exhauster, and a discharge-pipe leading from the first tank to the said tank, whereby the liquid after treatment in the first tank may be subjected to the action of ozone *in vacuo*, in the secondary tank, substantially as described.

5. In an apparatus for purifying saccharine or other liquids, the combination with a main tank for containing the liquid to be treated, means for subjecting said liquid to electrolytic treatment, and a secondary tank provided with connections to the main tank, an ozone-reservoir and an exhaust apparatus connected to the said secondary tank and spraying device in said tank located in line with the inlet for ozone and liquid to said tank, substantially as described.

6. In an apparatus for purifying saccharine or other liquids, the combination with a main tank for containing liquid to be treated, means for subjecting said liquid to the action of an electric current *in vacuo*, a secondary tank provided with connections to an ozone-generator and air-exhauster, and also provided with a liquid-inlet and a spraying device in said latter tank located in line with the inlet of ozone and liquid thereto, whereby the liquid may be introduced in said tank in a finely-divided state and intimately mixed with the ozone gas, substantially as described.

7. In an apparatus for purifying saccharine or other liquids, the combination with a main tank for containing liquid to be treated, means for subjecting said liquid to the action of an electric current, and means for subjecting said liquid to the action of ozone gas *in vacuo*, of a secondary tank provided with connections to an ozone-reservoir and air-exhauster, and also provided with a liquid-inlet and a spraying device located in said tank in line with the liquid-inlet to said tank, substantially as described.

8. In an apparatus for purifying saccharine or other liquids, the combination with a main tank having air-tight joints for holding the liquid to be treated, and means for subjecting said liquid to electrolytic action, of a secondary tank provided with connections to an ozone-reservoir, and an air-exhauster connected with said main tank for exhausting the air therefrom, a pipe leading from the main tank to the secondary tank, and a horizontal agitator rotatably mounted in said secondary tank for agitating the liquid, substantially as described.

9. In an apparatus for purifying saccharine or other liquids, the combination with a tank for holding the liquid, of an inlet-pipe for the liquid, a pipe adapted to connect to an air-exhauster, a supply-pipe adapted to be connected to an ozone-reservoir, a horizontal mechanically-operated agitator in the bottom of said tank, and perforated pipes carried by and moving with said agitator and connected with the ozone-supply pipe, so as to direct the ozone gas upwardly through the liquid in the tank, substantially as described.

10. In an apparatus for purifying saccharine or other liquids, the combination in a tank for holding the liquid for treatment, of an inlet-pipe for the liquid, perforated pipes within the tank, a pipe connecting said perforated pipes with a supply of ozone gas, a horizontal agitator rotatably mounted above the bottom of the tank, and a perforated pipe carried by said agitator and connected to the ozone-supply, substantially as described.

11. In an apparatus for purifying saccharine or other liquids, the combination with a tank for holding the liquid for treatment, of an inlet-pipe for the liquid, a spraying device in line with said inlet-pipe, a pipe leading from a supply of ozone gas into the top of the tank, and discharging near the liquid-inlet, and a series of perforated pipes disposed vertically within the tank and connected to the ozone-gas supply, substantially as described.

12. In an apparatus for purifying saccharine or other liquids, the combination in a tank for holding the liquid for treatment, of an inlet-pipe for the liquid, a spraying device in said tank in line with said inlet, a pipe leading from an ozone-gas supply into the top of the tank near the liquid-inlet, a series of perforated pipes vertically disposed within the tank, and an agitator rotatably mounted above the bottom of the tank, substantially as described.

13. In an apparatus for purifying saccharine or other liquids, the combination with a tank for holding the liquid for treatment, of an inlet for the liquid, a spraying device in said tank in line with the inlet, an ozone-gas-supply pipe leading into the top of the tank near said inlet, a series of perforated pipes vertically disposed within the tank and connected with the ozone-gas supply, and an agitator rotatably mounted above the bottom of the tank and carrying a perforated pipe communicating with the ozone-gas supply, substantially as described.

14. In an apparatus for purifying saccharine or other liquids, the combination with a tank for holding the liquid for treatment, of an inlet-pipe for the liquid, a horizontal agitator consisting of a hollow hub rotatably mounted above the bottom of the tank and vanes extending from said hub, a pipe communicating with the bottom of said hub and connected to an ozone-gas supply, and a perforated pipe carried by the vanes and communicating with said hub, substantially as described.

15. In an apparatus for purifying saccharine or other liquids, the combination with the main tank for containing the liquid to be treated and means for electrolytically treating said liquid therein, of a second tank located below the main tank, connections between said second tank and an air-exhauster and an ozone-gas supply, a reservoir interposed between the two tanks and connected with the discharge of said main tank, and a spraying device in the top of the second tank, and a pipe leading from said reservoir through the top of the said second tank to said spraying device, substantially as described.

16. In an apparatus for purifying saccharine or other liquids, the combination of a main tank for containing the liquid to be treated, means for treating said liquid by electrolytic action, with a tank located below the main tank, a reservoir between the two tanks and connected with the discharge of the main tank, a pipe leading into said reservoir above the liquid-level thereof and connected to a source of air-pressure, a spraying device in the top of the said second tank, and a pipe leading from the reservoir to the spraying device, substantially as described.

In testimony whereof I have signed my name to this specification in the presence of two subscribing witnesses.

MARSHALL PRIDHAM.

Witnesses:
S. A. TERRY,
M. H. MILES.